United States Patent
Kim et al.

(10) Patent No.: US 9,726,853 B2
(45) Date of Patent: Aug. 8, 2017

(54) AUTO-FOCUS CAMERA MODULE AND ELECTRONIC DEVICE INCLUDING THE SAME

(71) Applicant: Samsung Electronics Co., Ltd, Gyeonggi-do (KR)

(72) Inventors: Taehyok Kim, Gyeonggi-do (KR); Youngbok Yu, Gyeonggi-do (KR); Sunggoo Her, Gyeonggi-do (KR); Youngkwon Yoon, Seoul (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 33 days.

(21) Appl. No.: 14/740,007

(22) Filed: Jun. 15, 2015

(65) Prior Publication Data
US 2015/0370035 A1 Dec. 24, 2015

(30) Foreign Application Priority Data
Jun. 23, 2014 (KR) ........................ 10-2014-0076658

(51) Int. Cl.
*G02B 7/10* (2006.01)
*H04N 5/225* (2006.01)
*G02B 7/02* (2006.01)

(52) U.S. Cl.
CPC ........... *G02B 7/102* (2013.01); *H04N 5/2253* (2013.01); *H04N 5/2254* (2013.01); *H04N 5/2257* (2013.01); *G02B 7/026* (2013.01)

(58) Field of Classification Search
CPC ...... G02B 7/102; G02B 7/026; H04N 5/2253; H04N 5/2254; H04N 5/2257
USPC ......................... 348/345, 373, 374
See application file for complete search history.

(56) References Cited

U.S. PATENT DOCUMENTS

| 7,692,712 | B2 | 4/2010 | Chi | |
| 2007/0177279 | A1* | 8/2007 | Cho | G02B 7/102 359/692 |
| 2009/0021624 | A1* | 1/2009 | Westerweck | H04N 5/2257 348/345 |
| 2010/0208369 | A1* | 8/2010 | Shin | H04N 5/2254 359/811 |
| 2012/0307385 | A1* | 12/2012 | Mitani | G02B 7/04 359/824 |
| 2013/0308202 | A1* | 11/2013 | Uno | G02B 7/102 359/699 |

(Continued)

FOREIGN PATENT DOCUMENTS

KR    100781273 B1    11/2007

*Primary Examiner* — Nhan T Tran

(57) ABSTRACT

An electronic device includes an auto-focus camera module. The auto-focus camera module comprises a lens module equipped with at least one lens and including an cylindrical insertion unit formed therein; and a carrier formed with a hollow portion, into which the insertion unit of the lens module is inserted in an optical axis direction of the lens, wherein the lens module includes a first rotation prevention portion, the carrier includes a second rotation prevention portion formed at a position corresponding to the first rotation prevention portion, and in a state where the insertion unit of the lens module is inserted into the hollow portion of the carrier, the first rotation prevention portion and the second rotation prevention portion are engaged with each other so as to prevent the lens module from being rotated with respect to the carrier.

16 Claims, 15 Drawing Sheets

(56) References Cited

U.S. PATENT DOCUMENTS

2016/0209622 A1* 7/2016 Ito .......................... G02B 7/10

* cited by examiner

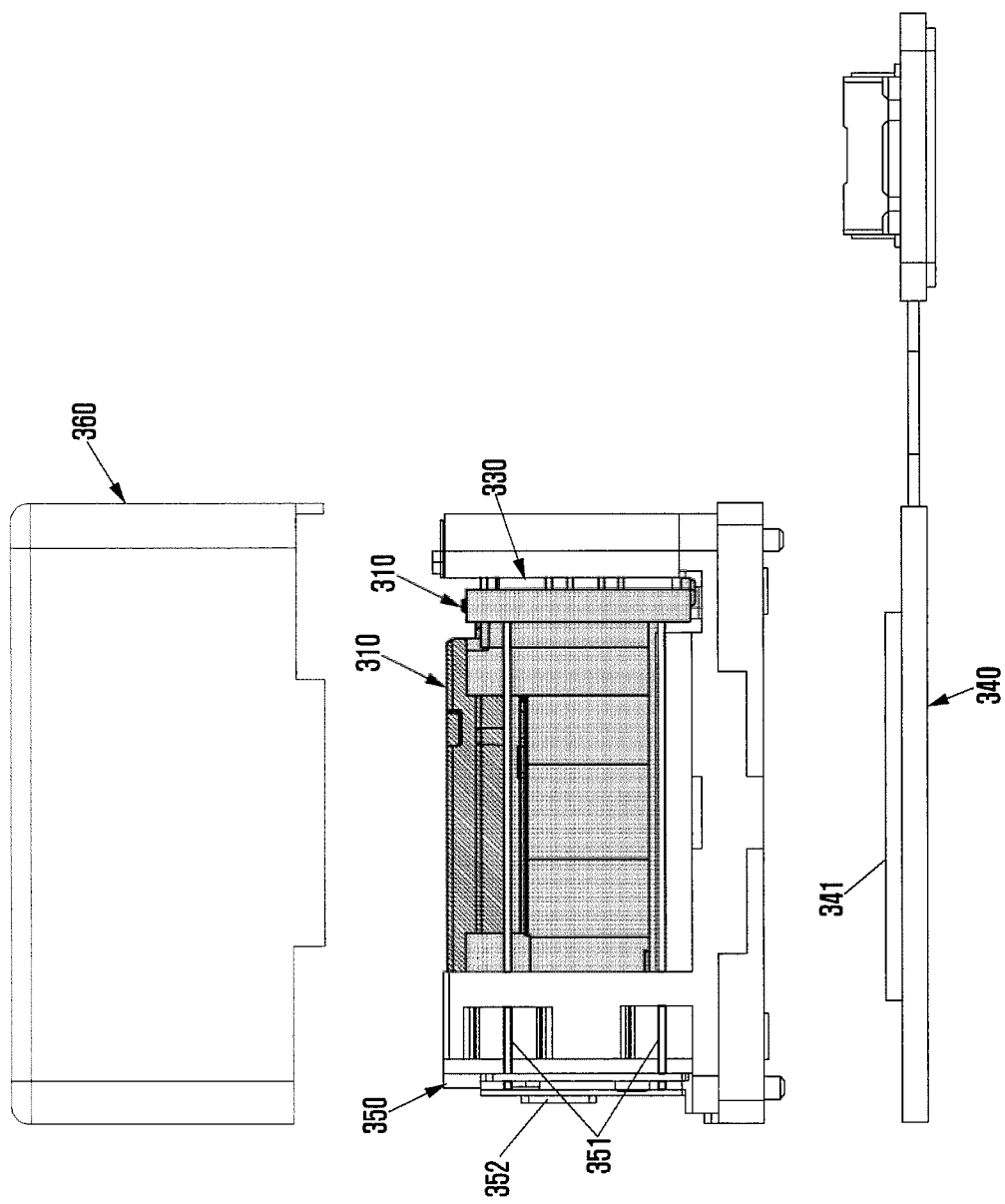

AUTO-FOCUS CAMERA MODULE AND ELECTRONIC DEVICE INCLUDING THE SAME

CROSS-REFERENCE TO RELATED APPLICATION(S) AND CLAIM OF PRIORITY

The present application is related to and claims benefit of priority under 35 U.S.C. §119(a) of Korean Patent Application No. 10-2014-0076658, filed on Jun. 23, 2014, which is hereby incorporated by reference for all purposes as if fully set forth herein.

TECHNICAL FIELD

Various embodiments of the present disclosure are related to a camera module having an auto-focus function and an electronic device including the same. More particularly, the various embodiments of the present disclosure are related to a camera module, in which a distance between the camera module and the image sensor is capable of being adjusted mechanically in an auto-focus camera module so as to correct and adjust an operation section of an actuator configured to reciprocate a lens within a predetermined section.

BACKGROUND

An auto-focus method is subdivided into an active type that performs focusing by measuring a distance to a subject using an infrared ray and a passive type that employs a dedicated sensor (CCD/CMOD) configured to read a contrast of a subject.

The passive type auto-focus method uses a TTL (Through-The-Lens) contrast detection method. The contrast detection method continuously calculates the contrast of a part of an image (mainly the central portion) of an image while moving a lens, and determines that the image is in focus when the contrast is maximized. Meanwhile, in the case of the passive-type auto-focus method, a lens should be moved in an optical axis direction with respect to an image sensor in order to perform focusing.

An auto-focus camera module is equipped with an actuator for implementing auto-focus, and the actuator is generally designed and manufactured to constitute one assembly together with the lens module.

A method of coupling a lens module to a camera module may be subdivided into two methods. A first one is a method of coupling a thread type lens module using a screw to a camera module, and a second one is a method of coupling a screwless type lens module to a camera module.

The thread type coupling method refers to a method in which a male screw is formed on the lens module, a female screw is formed on a carrier that accommodates the lens module, and the lens module and the carrier are fastened to each other by rotary coupling of the male screw and the female screw. The screwless type coupling method refers to a method in which no threads are not designed on a lens module and a carrier, and the lens module and the carrier are fastened to each other by a combination of a cylinder and a ring-shaped structure.

SUMMARY

To address the above-discussed deficiencies, it is a primary object of the present disclosure to prevent occurrence of tilt, that is to prevent an optical axis from being deviated simultaneously when the focal length of a camera module includes a screwless type lens module.

With a manufacturing tolerance of a lens module and a camera module, the movable distance in the optical axis direction may be further reduced, or in some cases, may be out of a pre-set focal length. In particular, in the camera module, which is gradually miniaturized, since the lens module is very constrictive to a moving distance in the optical axis direction for the purpose of auto-focus, it is necessary to adjust a starting point for the focus adjustment of the actuator.

In accordance with embodiments of the present disclosure, an auto-focus camera module comprises: a lens module equipped with at least one lens and including an cylindrical insertion unit formed therein; and a carrier formed with a hollow portion, into which the insertion unit of the lens module is inserted in an optical axis direction of the lens, wherein the lens module includes a first rotation prevention portion, the carrier includes a second rotation prevention portion formed at a position corresponding to the first rotation prevention portion, and in a state where the insertion unit of the lens module is inserted into the hollow portion of the carrier, the first rotation prevention portion and the second rotation prevention portion are engaged with each other so as to prevent the lens module from being rotated with respect to the carrier.

The first rotation prevention portion and the second rotation prevention portion may be formed to be engaged with each other as a rotation angle of the lens module is changed with respect to the carrier.

The lens module may include a first insertion adjustment portion, the carrier includes a second insertion adjustment portion formed to correspond to the first insertion adjustment portion, and a depth of the insertion unit of the lens module inserted into the hollow portion of the carrier is adjusted step by step by the second insertion adjustment portion and the first insertion adjustment portion.

When the first insertion adjustment portion and the second insertion adjustment portion are in contact with each other, insertion of the insertion unit into the hollow portion may be restricted.

The first insertion adjustment portion may be a reference projection having a projection shape protruding from the outer circumference of the lens module, and the second insertion adjustment portion is a step portion formed with a plurality of reference faces to be in contact with the reference projection of the first insertion adjustment portion.

The second insertion adjustment portion may be a reference projection protruding from one end of the carrier, and the first insertion adjustment portion may include a step portion on which a plurality of reference faces to be in contact with the reference projection of the second insertion adjustment portion.

The reference faces may be formed by a plurality of steps with stair shapes.

When the lens module and the carrier is coupled to each other, the reference projection may come in contact with any one of the plurality of reference faces, and as the plurality of reference faces that are in contact with the reference projection are changed, the depth of the insertion unit of the lens module inserted into the hollow portion of the carrier may be changed.

The reference projection may be positioned such that a 120° interval is maintained between neighboring reference projections.

The first rotation prevention portion may include an engaging projection protruding from an outer circumference of the lens module, the second rotation prevention portion includes a plurality of engaging grooves to be engaged with the engaging projection, and the plurality of engaging grooves are formed along the circumference of the hollow portion.

The engaging projection may be engaged in any one of the plurality of engaging grooves to restrict free rotation of the lens module with respect to the carrier.

The plurality of engaging grooves may be three engaging grooves.

The camera module may be further include: an actuator moving the carrier in an optical axis direction.

The camera module may further include: an image sensor facing the lens module, wherein as one of the plurality of reference faces, where the reference projection is in contact is changed, a spacing between lens module and the image sensor is adjusted.

In accordance with embodiments of the present disclosure, an electronic device may comprise: an auto-focus camera module, wherein the auto-focus camera module comprises: a lens module equipped with at least one lens and including an cylindrical insertion unit formed therein; and a carrier formed with a hollow portion, into which the insertion unit of the lens module is inserted in an optical axis direction of the lens, wherein the lens module includes a first rotation prevention portion, the carrier includes a second rotation prevention portion formed at a position corresponding to the first rotation prevention portion, and in a state where the insertion unit of the lens module is inserted into the hollow portion of the carrier, the first rotation prevention portion and the second rotation prevention portion are engaged with each other so as to prevent the lens module from being rotated with respect to the carrier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10 and 11 illustrate the operating state of the carrier according to the embodiments of the present disclosure;

DETAILED DESCRIPTION

Figure 1:
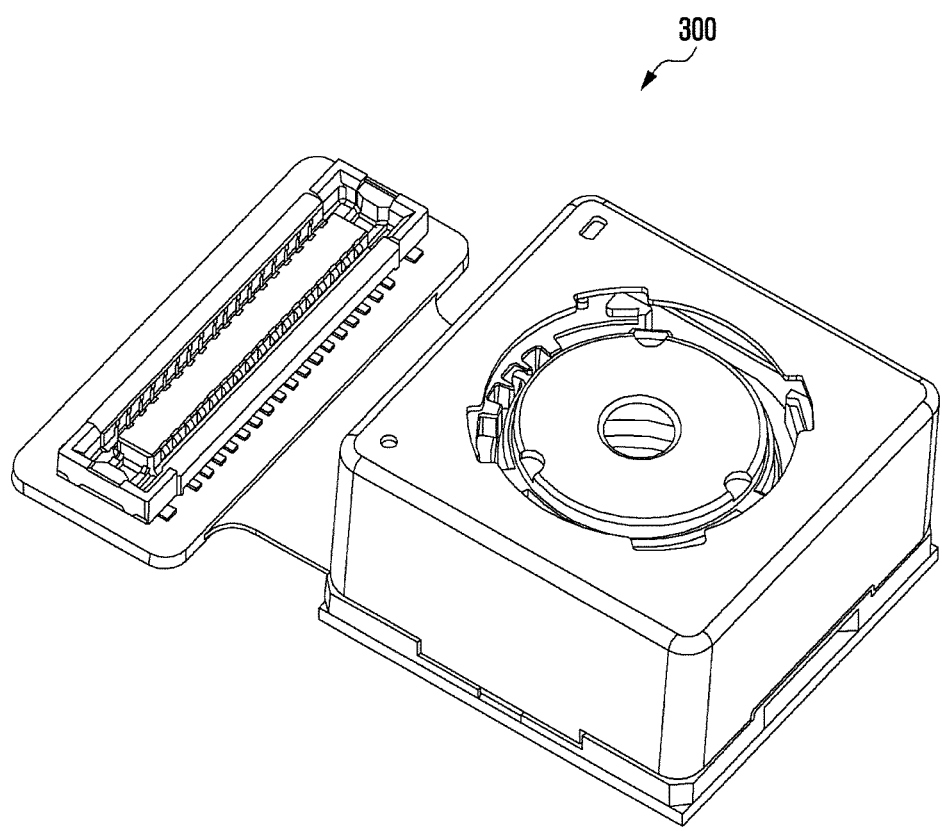
FIG. 1 illustrates a perspective view of a camera module according to embodiments of the present disclosure.

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless device. Hereinafter, the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" or "can include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined the present disclosure.

When the thread type is applied, there is a problem in that since the lens module is rotated, it is difficult to manage a resolution of the lens, and to measure, correct, manage, and improve a tilt of the lens. In general, the male threads of the lens and the female threads of the carrier are fabricated to be parallel with the optical axis at the time of rotating and stopping. However, there is a practical difficulty in fabricating, measuring, correcting and improving the threads. That is, it is difficult to make the lens always parallel with the image sensor at the time of screw-coupling.

In the case where the screwless type lens is applied, the Back Focal Length (BIT) of the lens is not adjustable. When an error occurs in the back focal length, an error also occurs in a predetermined focus moving section of the actuator. That is, in the case where the screwless type lens module is applied, the position of the lens module is fixed to the carrier. Thus, it is impossible to mechanically adjust the focal length.

According to various embodiment of the present disclosure, an electronic device includes a camera module having passive type auto-focus function. Hereinafter, specific embodiments among the various embodiments of the present disclosure will be described.

Figure 2:
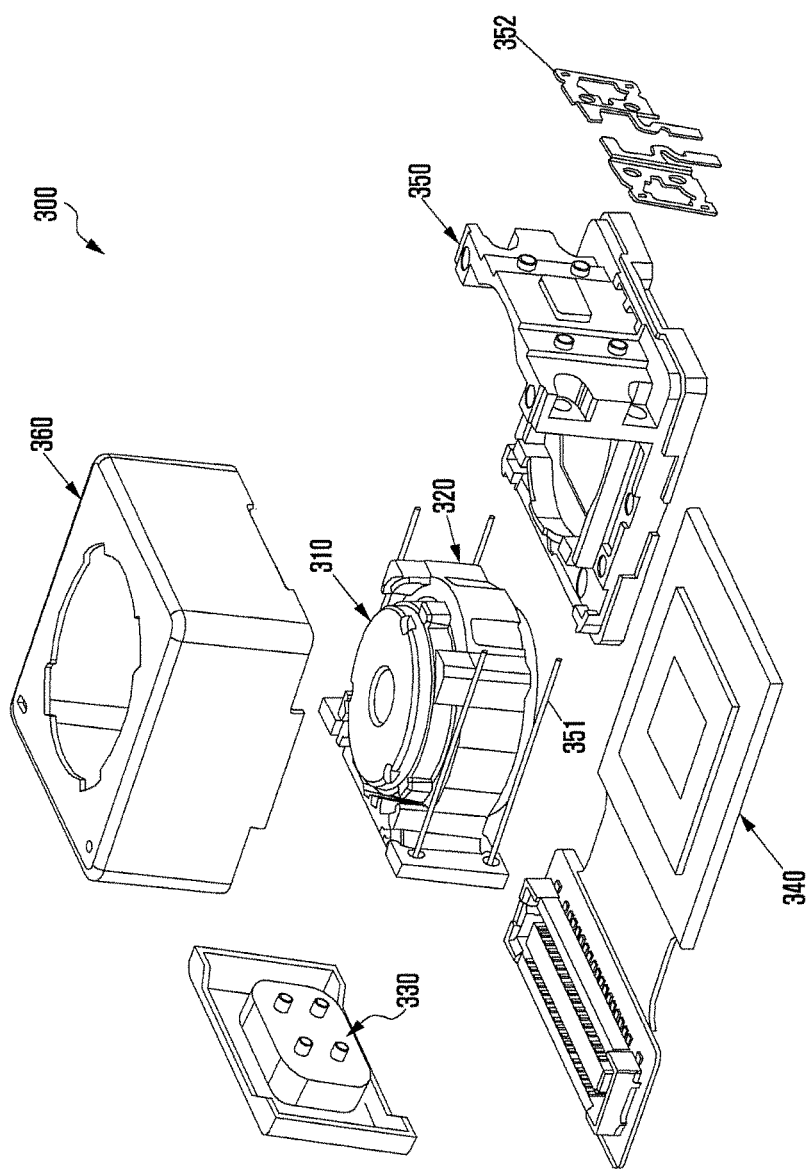
FIG. 2 illustrates a perspective view illustrating the camera module according to embodiments of the present disclosure in a disassembled state.
Figure 3:
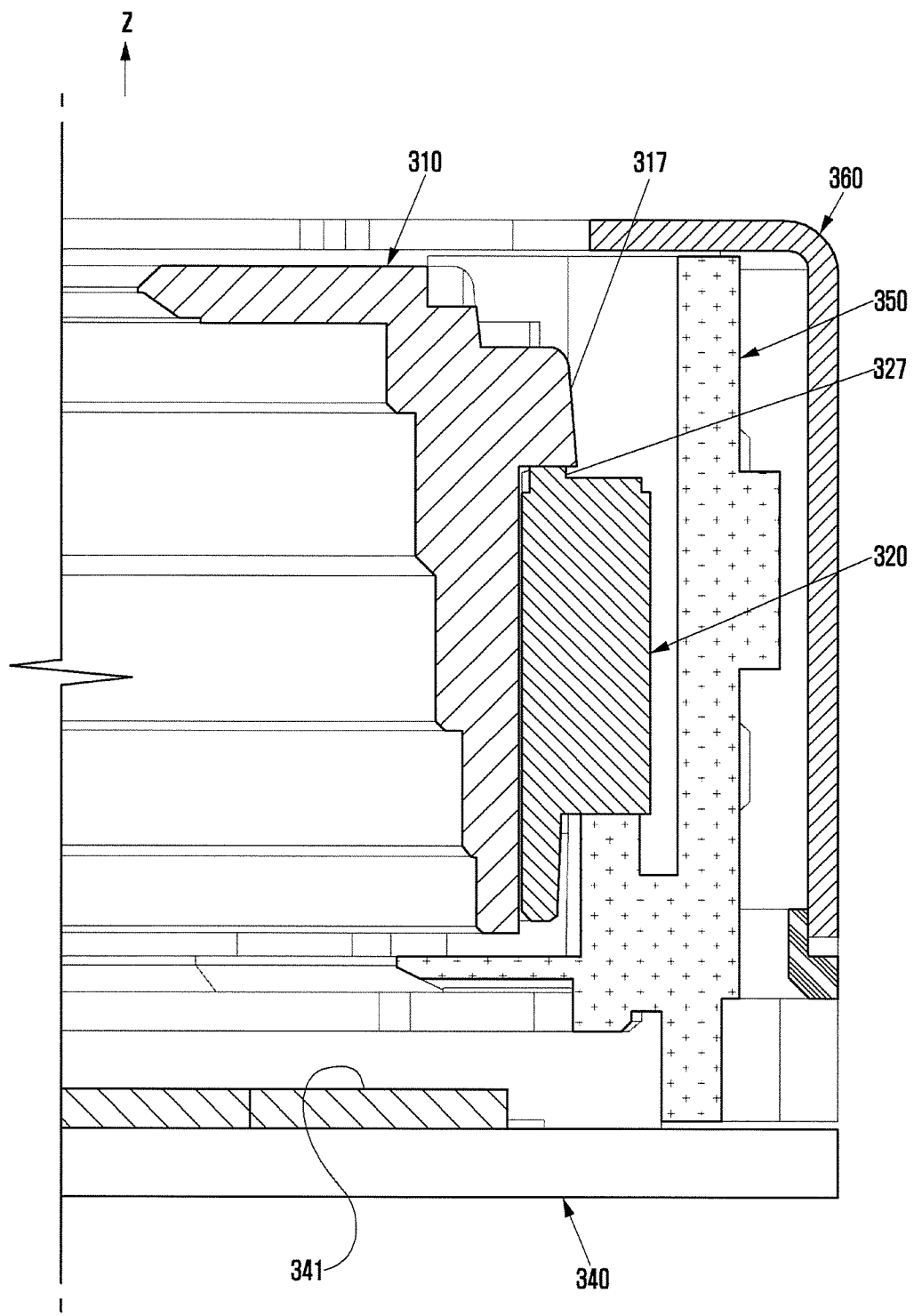
FIG. 3 illustrates a cross-sectional view of a portion of the camera module according to the embodiments of the present disclosure.

FIG. 1 is a perspective view of a camera module 300 according to embodiments of the present disclosure. FIG. 2 is a perspective view illustrating the camera module 300 according to the embodiments of the present disclosure in a disassembled state. FIG. 3 is a cross-sectional view of a portion of the camera module 300 according to the embodiments of the present disclosure.

The camera module 300 includes a lens module 310, a carrier 320, an actuator drive unit 330, a sensor unit 340, a housing 350, and a cover 360.

The lens module 310 is a substantially cylindrical lens barrel structure having an inner space in which at least one lens is mounted in the optical axis direction.

The carrier 320 is an accommodation member that accommodates a part of the lens module 310.

The actuator drive unit 330 guides the carrier 320 in the optical axis direction for auto-focus. The actuator drive unit 330 is coupled to the housing 350.

The sensor unit 340 is a substrate member on which an image sensor 341 is mounted, in which the image sensor 341 detects an image of a subject which is incident through the lens and converts the image into an electric signal. The sensor unit 341 is installed to seal the lower part of the housing 350.

The camera module 300 is assembled in a state where the lens module 310, the carrier 320, the housing 350, and the sensor unit 340 in the optical axis direction.

The lens module 310 is coupled to the carrier 320, and the carrier 320 is guided by the actuator drive unit 330 to be movable in the optical axis direction. Since the lens module 310 is movable in the optical axis direction, the lens module 310 may be moved toward or away from the sensor unit 340. That is, as the lens of the lens module 310 is moved toward or away from the image sensor 341, the auto-focus may be performed.

The cover 360 is coupled from the upper portion of the housing 350 to enclose the housing 350 and the actuator drive unit 330.

Figure 4:
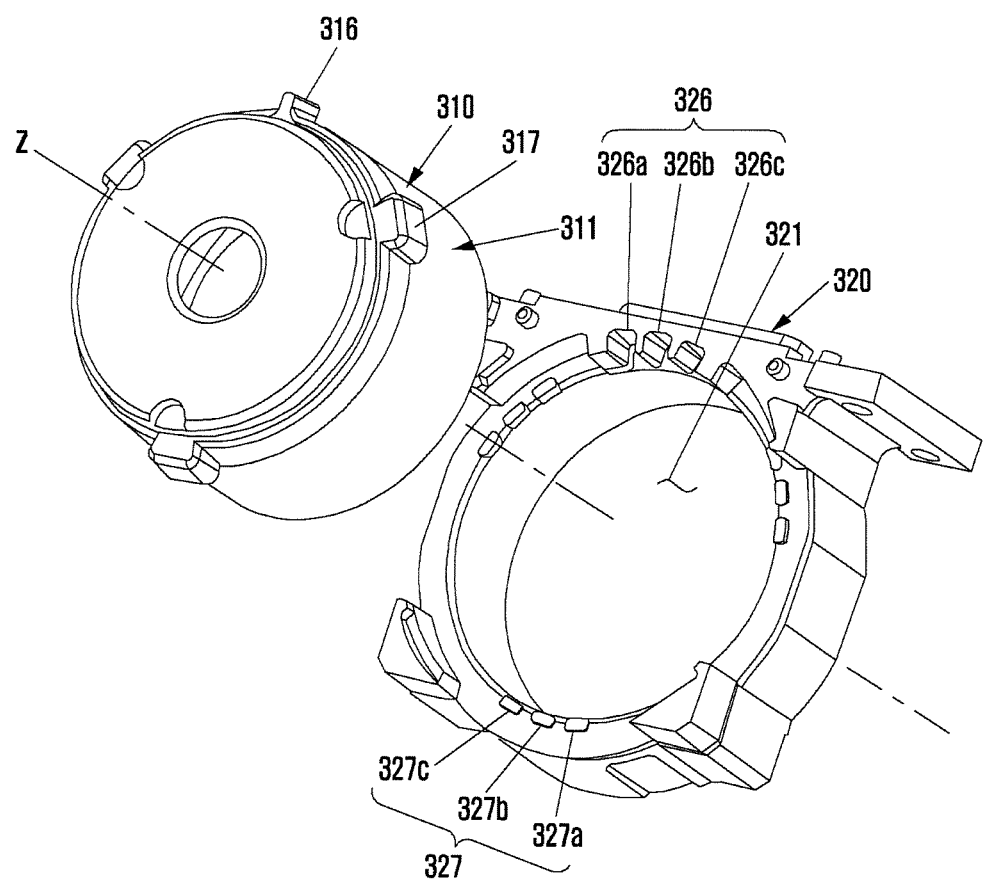
FIGS. 4 to 6 illustrate perspective views of a lens module and a carrier according to the embodiments of the present disclosure in a disassembled state.
Figure 5:
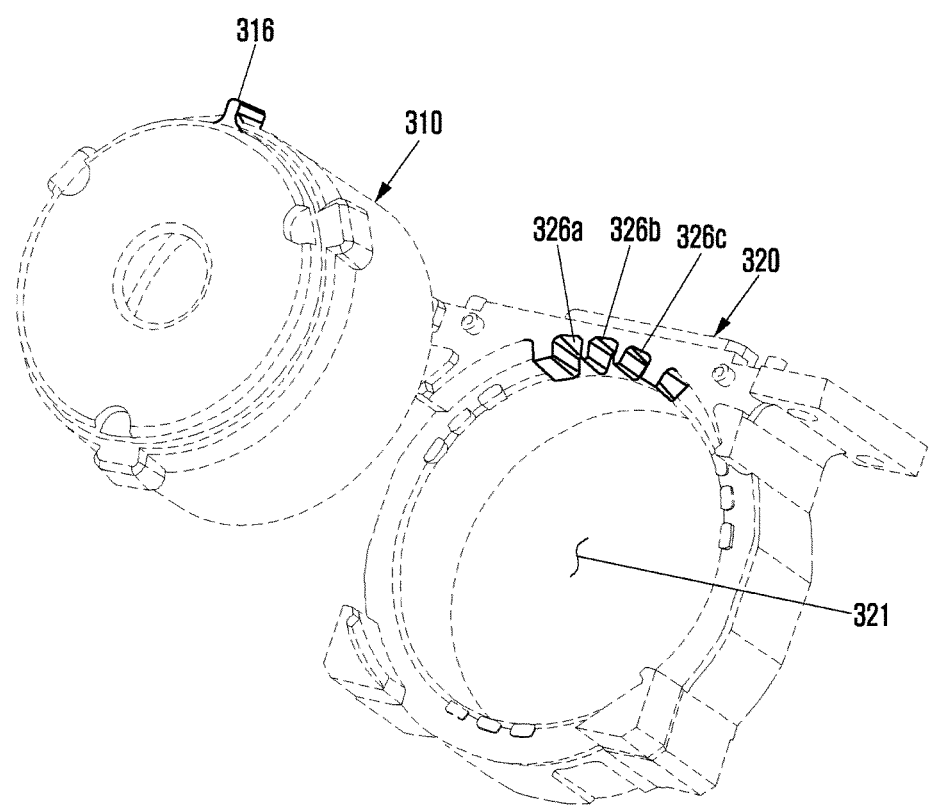
Figure 6:
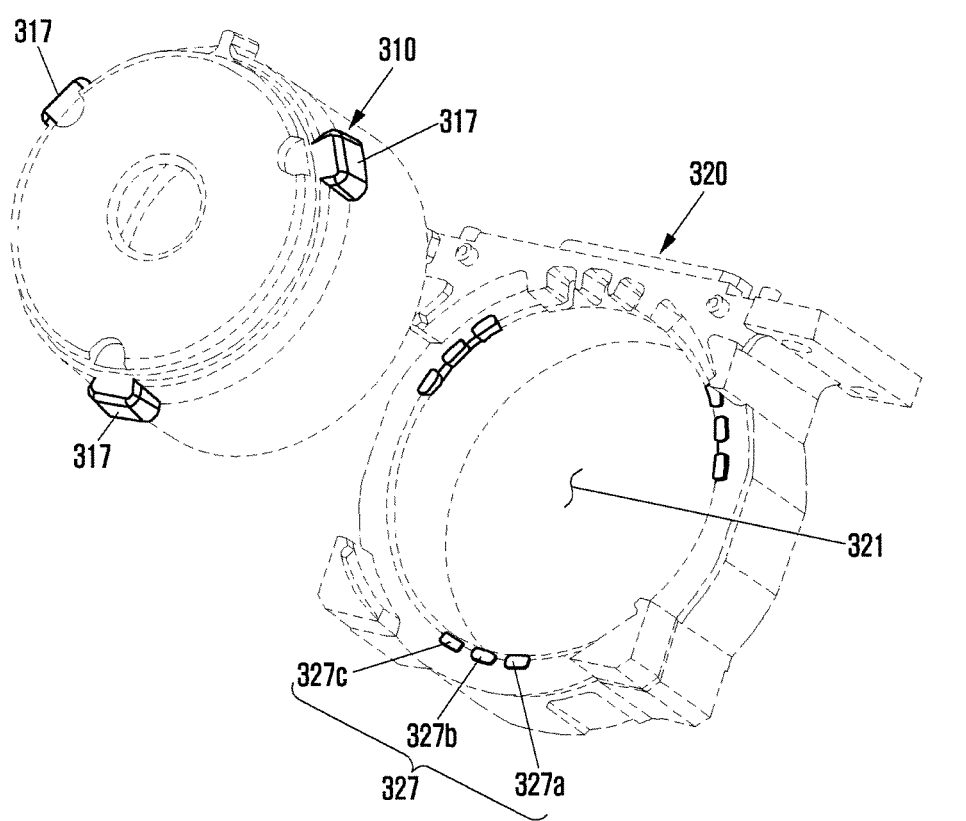

FIGS. 4 to 6 are perspective views illustrating the lens module and the carrier according to the embodiments of the present disclosure in a disassembled state.

One side of the lens module 310 is formed with an insertion unit 311 having a cylindrical outer circumference. A part of the lens module 310 is inserted into the carrier 320. The carrier 320 includes a hollow portion 321, of which the opposite sides are opened. The insertion unit 311 of the lens module 310 is inserted into and coupled to the hollow portion 321. At this time, the insertion unit 311 of the lens module 310 is inserted into the hollow portion 321 of the carrier 320 in the optical axis direction of the lens. The insertion unit 311 has a cylindrical shape having an outer circumferential face, and the hollow portion 321 has an inner circumferential face corresponding to the outer circumferential face of the insertion unit 311. In the state where the insertion unit 311 is inserted into the hollow portion 321, the lens module 310 may be freely rotatable in the state where it is inserted into the carrier 320 unless there is a limit by a separate configuration.

Referring to FIG. 5, in order to prevent the lens module 310 from freely rotating in relation to the carrier 320, the lens module 310 and the carrier 320 include rotation prevention portions 316 and 326.

The lens module 310 includes a first rotation prevention portion 316. The carrier 320 includes a second rotation prevention portion 326 formed to correspond to the first rotation prevention portion 316. When the first rotation prevention portion 316 and the second rotation prevention portion 326 are engaged with each other, the free rotation of the lens module 310 in relation to the carrier 320 in the state where the insertion unit 311 of the lens module 310 is inserted into the hollow portion 321 of the carrier 320.

The first rotation prevention portion 316 and the second rotation prevention portion 326 are characterized in that they are formed to be engaged with each other as the rotation angle of the lens module 310 is changed in relation to the carrier 320. Referring to FIG. 5, the second rotation prevention portion 326 includes a plurality of engaging grooves 326a, 326b, and 326c formed at a predetermined interval. The plurality of engaging grooves 326a, 326b, and 326c may be formed on the circumference of the hollow portion 321 at a side of the hollow portion 321.

The first rotation prevention portion 316 may be selectively engaged with the plurality of engaging grooves 326a, 326b, and 326c of the second rotation prevention portion 326.

Referring to FIG. 5, the first rotation prevention portion 316 may be formed as an engaging projection protruding from the outer circumference of the lens module 310. Although FIG. 5 illustrates one engaging projection of the first rotation prevention portion 316, a plurality of engaging projections may be formed as needed.

When the engaging projection of the first rotation prevention portion 316 is engaged in any one of the plurality of engaging grooves 326a, 326b, and 326c, the free rotation of the lens module 310 of the carrier 320 is restricted. In the state where the insertion unit 311 is partially inserted into the hollow portion 321, the lens module 310 is freely rotatable in relation to the carrier 320. In order to prevent such free rotation, the engaging projection of the first rotation prevention portion 316 may be engaged in any one of the plurality of engaging grooves 326a, 326b, and 326c.

Although FIG. 5 illustrates three engaging grooves 326a, 326b, and 326c, the number of the engaging groove 326a, 326b, and 326c may be determined as needed.

Referring to FIG. 6, the lens module 310 and the carrier 320 include insertion adjustment portion 317 and 327 capable of adjusting the insertion depth of the lens module 310 into the carrier 370.

The lens module 310 includes a first insertion adjustment portion 317. The carrier 320 includes a second insertion adjustment portion 327 corresponding to the first insertion adjustment portion 317. The insertion depth of the insertion unit 311 of the lens module 310 into the hollow portion 321 of the carrier 320 is capable of being adjusted by the first insertion adjustment portion 317 and the second insertion adjustment portion 327.

When the first insertion adjustment portion 317 and the second insertion adjustment portion 327 are in contact with each other, the insertion unit 311 cannot be inserted into the hollow portion 321 anymore. That is, the insertion depth of the insertion unit 311 into the hollow portion 321 may be adjusted by the shapes of the first insertion adjustment portion 317 and the second insertion adjustment portion 327.

The first insertion adjustment portion 317 and the second insertion adjustment portion 327 may be shaped such that the insertion depth of the insertion unit 311 into the hollow portion 321 may be adjusted step by step.

Referring to FIG. 6, the first insertion adjustment portion 317 includes a plurality of projection shapes protruding at regular intervals from the other circumference of the lens module 310. The projection shapes protruding on the first insertion adjustment portion 317 are reference projections.

The second insertion adjustment portion 327 includes a step portion which is in contact with a reference projection of the first insertion adjustment portion 317. The step portion of the second insertion adjustment portion 327 includes a plurality of reference faces 327a, 327b, and 327c which are in contact with the reference projection of the first insertion adjustment portion 317.

The reference faces 327a, 327b, and 327c of the step portion of the second insertion adjustment portion 327 are formed by a plurality of steps with stair shapes. Each of the reference faces 327a, 327b, and 327c formed on the step portion of the second insertion adjustment portion 327 has a protrusion height from the carrier 320 which is different from those of the other reference faces.

When the lens module 310 and the carrier 320 are coupled to each other, each of the reference projections of the first insertion adjustment portion 317 is in contact with any one of the reference faces 327a, 327b, and 327c, and as the reference faces 327a, 327b, and 327c, which are in contact with the reference projections of the first insertion adjustment portion 317, are changed, the insertion depth of the insertion unit 311 and the lens module 310 into the hollow portion 321 of the carrier 320 is changed.

Retelling to FIG. 6, the neighboring reference projections of the first insertion adjustment portion 317 may be positioned at a 120° interval. That is, the first insertion adjustment portion 317 may have three reference projections formed along the circumferential direction of the lens module 310.

Figure 7:
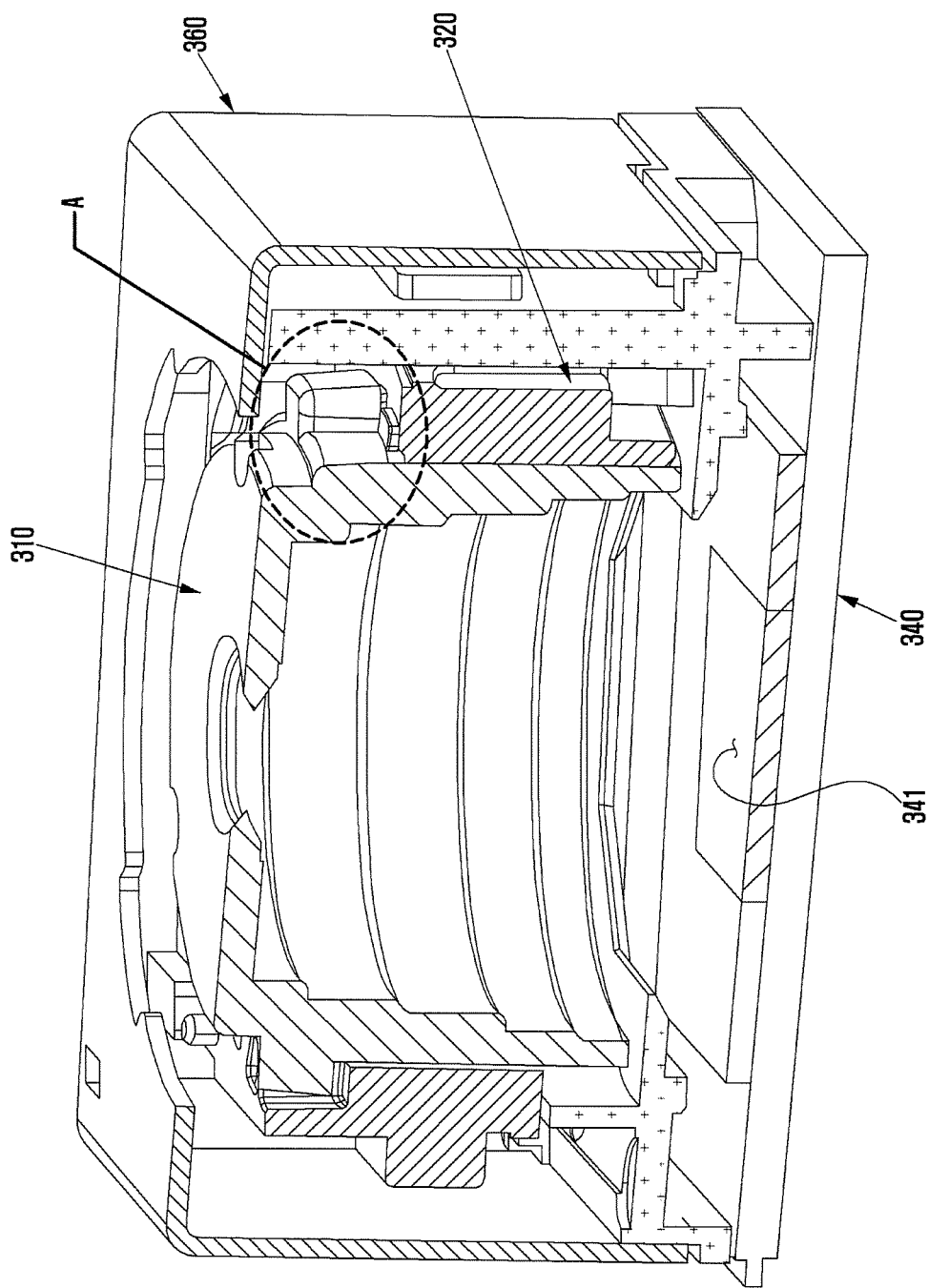
FIG. 7 illustrates a cross-sectional view illustrating the camera module according to the embodiments of the present disclosure.
Figure 8:
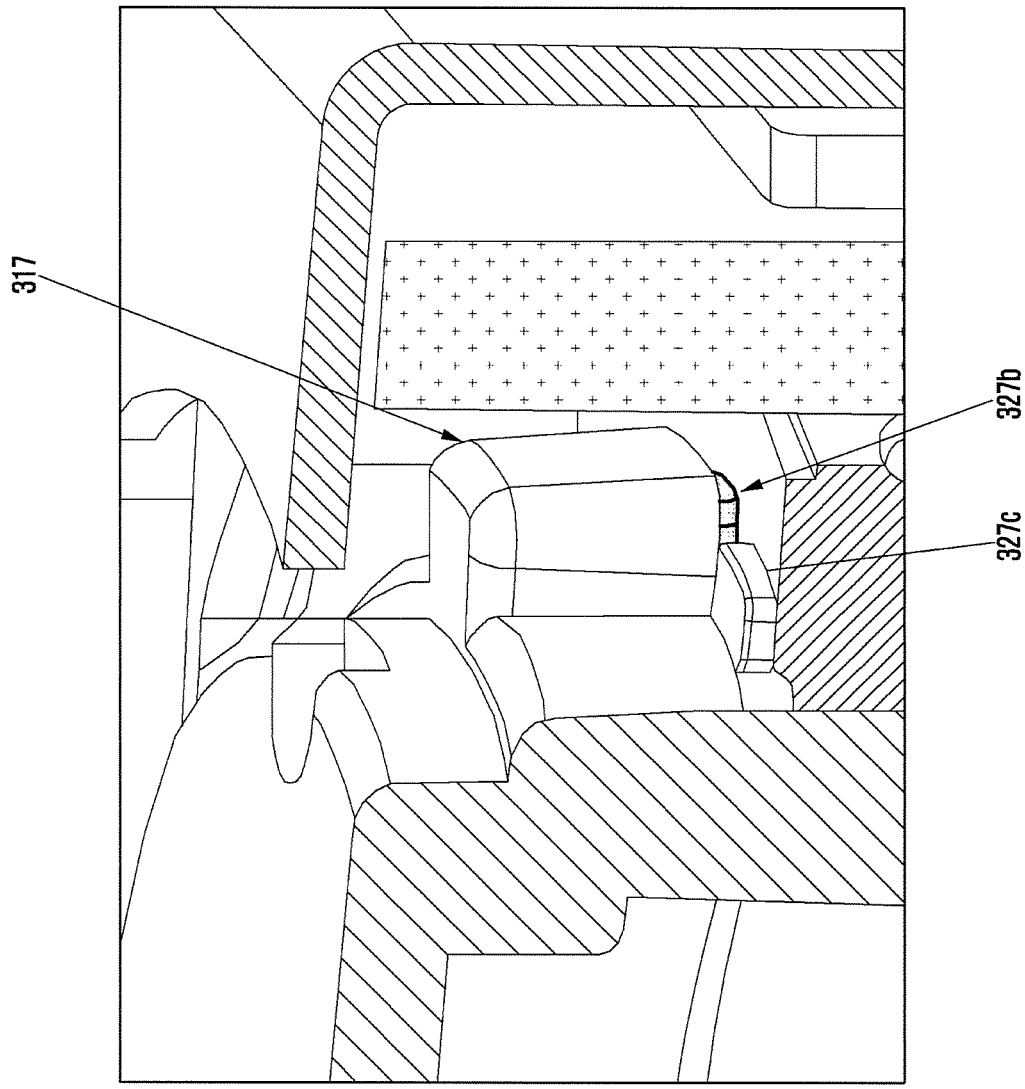
FIG. 8 illustrates the area indicated by "A" in FIG. 7 in an enlarged scale.

FIG. 7 is a cross-sectional view illustrating the camera module 300 according to the embodiments of the present disclosure. FIG. 8 illustrates the area indicated by "A" in FIG. 7 in an enlarged scale.

In the state where the lens module 310 and the carrier 320 are assembled, as the reference faces 327a, 327b, and 327c, which are in contact with the reference projections of the first insertion adjustment portion 317 of the lens module 310, are changed, the depth of the lens module 310 inserted into the carrier 320 is changed.

In the case where the reference projection of the first insertion adjustment portion 317 is in contact with the second reference face 327b, the lens module 310 may be inserted into the carrier 320 more deeply as compared to the case where the reference projection of the first insertion adjustment portion 317 is in contact with the third reference face 327c. As the lens module 310 is inserted into the carrier 320 more deeply, the lens is moved more closely to the image sensor 341.

Figure 9A:
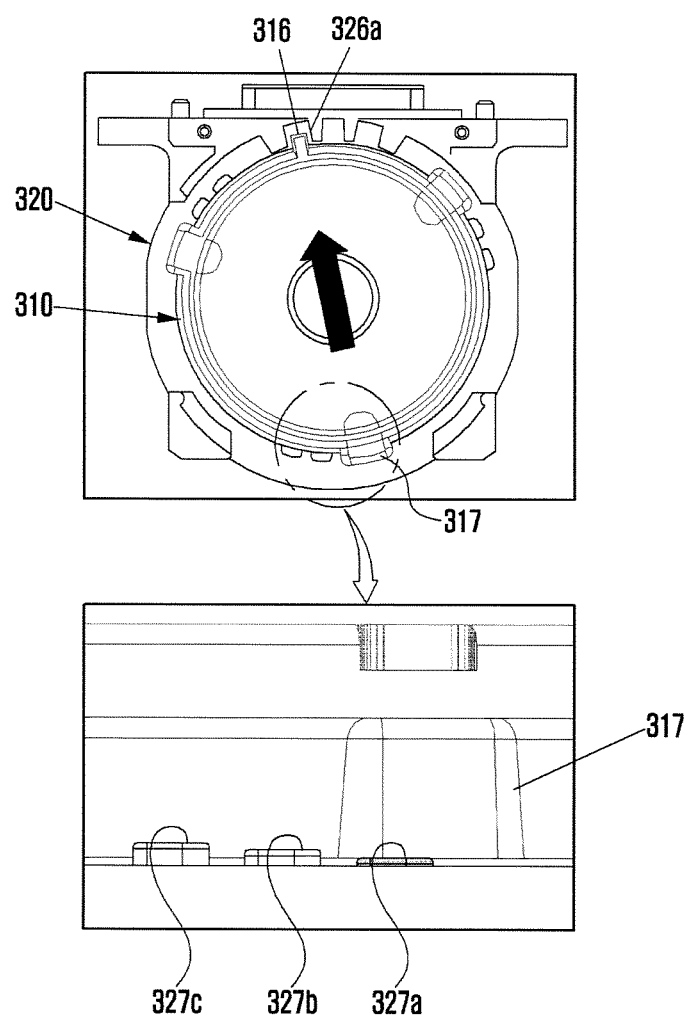
FIGS. 9A to 9C are views illustrating the lens module and the carrier according to the embodiments of the present disclosure in an assembled state.
Figure 9B:
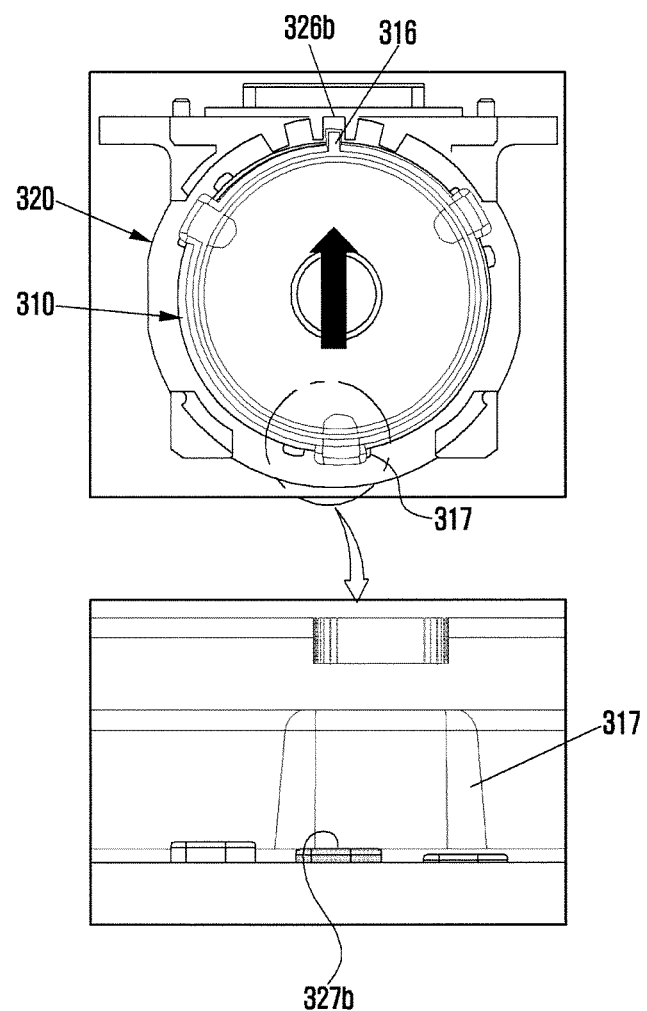
Figure 9C:
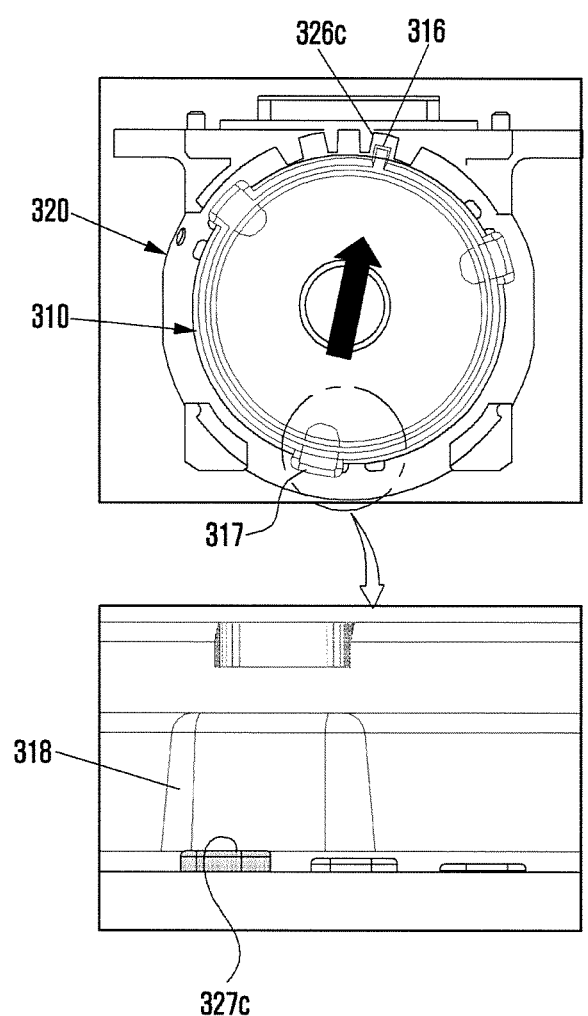

FIGS. 9A to 9C are views illustrating the lens module 310 and the carrier 320 according to the embodiments of the present disclosure in an assembled state. FIGS. 9A to 9C illustrate a positional relationship between the rotation prevention portions 316 and 326 and the insertion adjustment portions 317 and 327.

Referring to FIG. 9A, when the engaging projection of the first rotation prevention portion 316 is engaged in the first engaging groove 326a so as to prevent the rotation of the lens module 310, the reference projection of the first insertion adjustment portion 317 comes in contact with the first reference face 327a in the step portion of the second insertion adjustment portion 327. When the engaging projection of the first rotation prevention portion 316 is engaged in the second engaging groove 326b, the reference projection of the first insertion adjustment portion 317 comes in contact with the second reference face 327b of the step portion of the second insertion adjustment portion 327. When the engaging projection of the first rotation prevention portion 316 is engaged in the third engaging groove 326c, the reference projection of the first insertion adjustment portion 317 comes in contact with the third reference face 327c of the step portion of the second insertion adjustment portion.

When the reference projection of the first insertion adjustment portion 317 is in contact with the first reference face 327a, the lens module 310 is inserted into the carrier 320 to maximum. When the reference projection of the first insertion adjustment portion 317 is in contact with the third reference face 327c, the lens module 310 is inserted into the carrier 320 to minimum Although FIGS. 9A to 9C illustrate three reference faces 327a, 327b, and 327c, more or less than three reference faces 327a, 327b, and 327c may be formed. At this time, the engaging grooves 326a, 326b, and 326c may also be formed to correspond to the number of the reference faces 327a, 327b, and 327c. In the state where the lens is fixed to the lens module 310, the lens module 310 is inserted into the carrier 320, and upon being rotated by a predetermined range, the lens module 310 may be coupled to the carrier 320 by.

When the lens module 310 is excessively rotated with respect to the carrier 320 (e.g., 90° or more), the lens is rotated about the optical axis and the resolution of the lens may be changed. In order to fabricate the lens such that its resolution is constant or is maintained within a predetermined error range during the rotation of the lens, it is necessary to measure the resolution over the entire area where the lens is rotated. In addition, it is not easy to obtain a lens which has a constant resolution all over the entire area where the lens is rotated. That is, there is a practical problem in that the yield of lenses with a constant resolution is low.

In order to adjust the depth of the lens module 310 inserted into the carrier 320 while maintaining the resolution of the lens constantly, the rotation range of the lens module 310 with respect to the carrier 320 may be limited within a range of about 30°.

Figure 11:
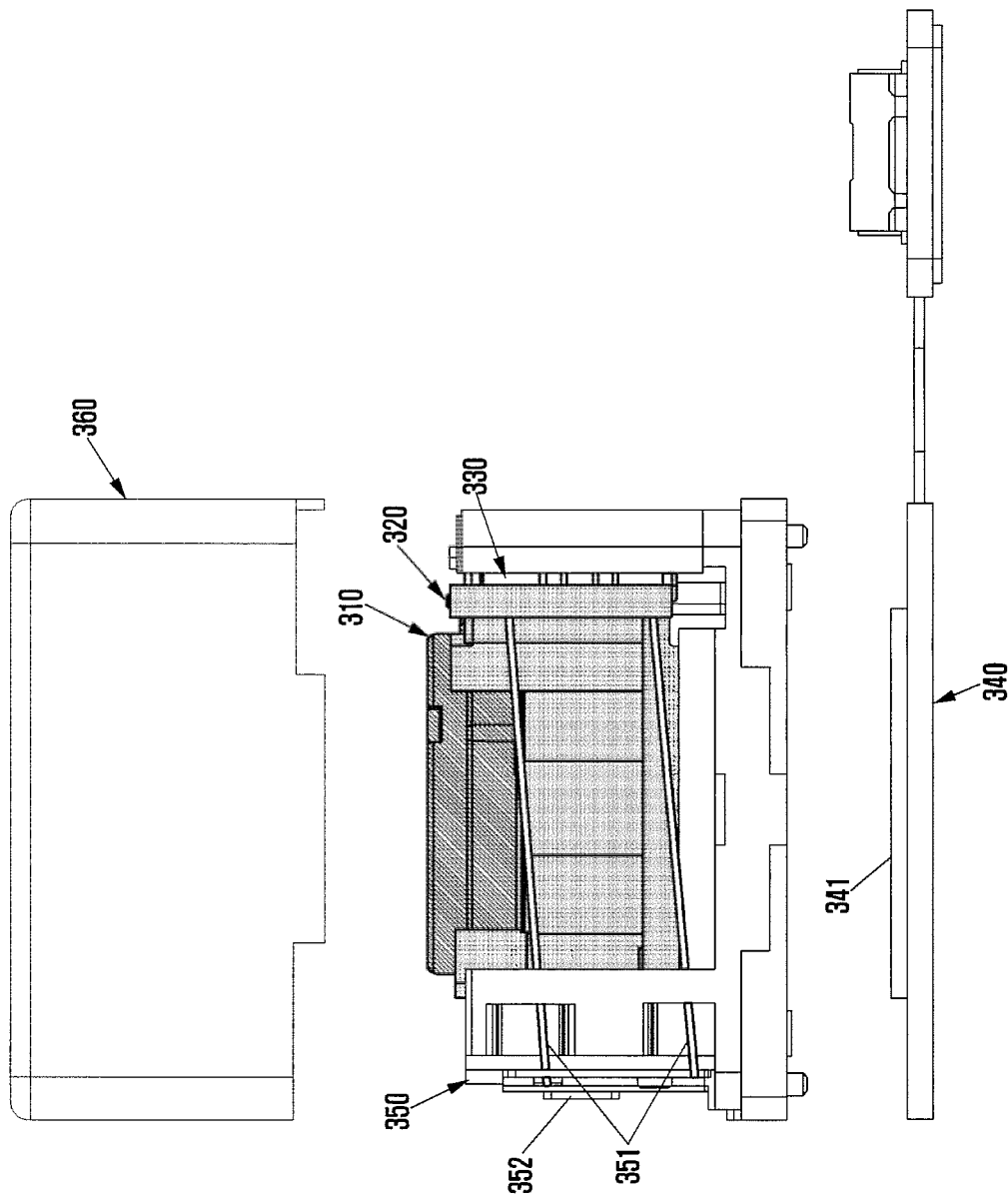

FIGS. 10 and 11 illustrate the operating state of the carrier 320 according to the embodiments of the present disclosure.

FIGS. 10 and 11 illustrate a process of moving the carrier 320 by the actuator drive unit 330. One side of the actuator drive unit 330 is coupled to the housing 350, and the carrier 320 may be moved by the actuator drive unit 330.

One side of the carrier 320 is coupled to the actuator drive unit 330, and a fixing plate 352 (FIG. 2) is positioned on the other side of the carrier 320 so that the one side of the carrier 320 and the fixing plate 352 are connected with each other by a wire 351. The carrier 320 is in contact with the housing 350 by the elasticity of the wire 351, and the actuator drive unit 330 guides the carrier 320 in the optical axis direction.

As the actuator drive unit 330 moves the carrier 320 in the optical axis direction, the lens of the lens module 310 may be moved toward or away from the image sensor 341. That is, as the plurality of reference faces 327a, 327b, and 327c, where the reference projections of the first insertion adjustment portion 317 are in contact, are changed, the spacing between the lens module 310 and the image sensor 341 may be adjusted.

Figure 12A:
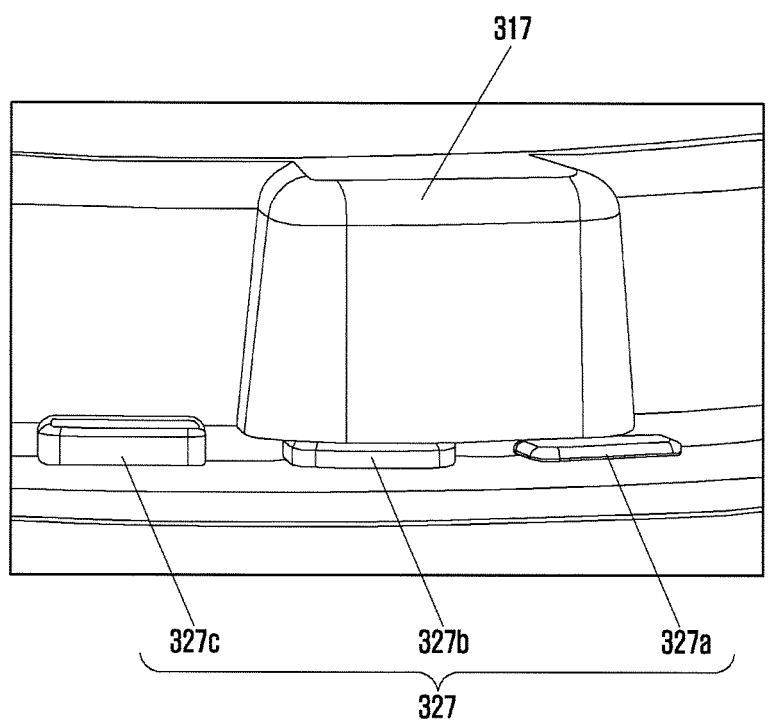
FIG. 12A illustrates a first insertion adjustment portion and a second insertion adjustment portion of the camera module according to a first embodiment of the present disclosure in an enlarged scale.
Figure 12B:
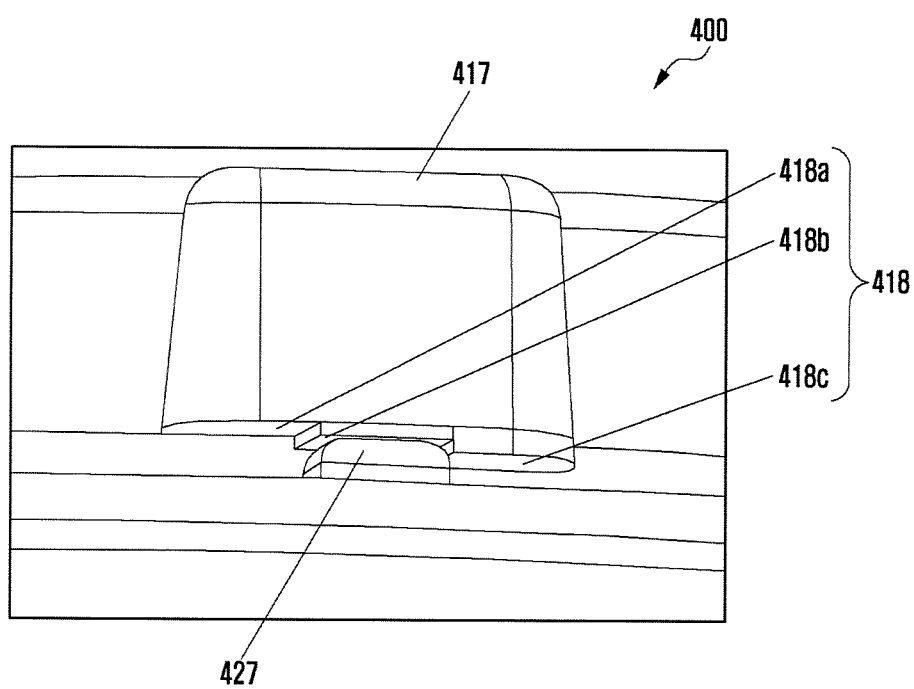
FIG. 12B illustrates a first insertion adjustment portion and a second insertion adjustment portion of a camera module according to a second embodiment of the present disclosure in an enlarged scale.

FIG. 12A illustrates the first insertion adjustment portion 317 and the second insertion adjustment portion 327 of the camera module according to a first embodiment of the present disclosure in an enlarged scale. FIG. 12B illustrates a first insertion adjustment portion 417 and a second insertion adjustment portion 427 of a camera module according to a second embodiment of the present disclosure in an enlarged scale.

The second embodiment has a configuration which is generally the same as that of the first embodiment. However, the first insertion adjustment portion 417 and the second insertion adjustment portion 427 are formed to have shapes which are opposite to those of the first embodiment.

Referring to FIG. 12B, the first insertion adjustment portion 417 of the camera module 400 includes a step portion 418, in which a plurality of reference faces 418a, 418b, and 418c are formed, and the reference faces 418a, 418b, and 418c of the step portion 418 form steps at a predetermined interval.

The second insertion adjustment portion 427 is characterized in that it is formed by a reference projection protruding one end of the carrier 320.

As the reference faces 418a, 418b, and 418c, where the reference projection of the second insertion adjustment portion 427 is in contact, are changed, the depth of the insertion unit 311 of the lens module 310 inserted into the hollow portion 321 of the carrier 320 may be changed.

According to the lens modules according to various embodiments of the present disclosure, an optimum operating range of the actuator may be changed after a lens focus of the lens module and an error related to a depth of the lens module inserted into the carrier are measured.

A process of adjusting the optimum operating range of the actuator according to the various embodiments of the present disclosure wilt be described with reference to the first embodiment. As in FIG. 6, the lens module 310 and the carrier 320 are manufactured with reference to a state where a reference projection of the first insertion adjustment portion 317 is positioned on the reference face 327b positioned at the center among the plurality of reference faces 327a, 327b, and 327c. For example, the lens module 310 and the carrier 320 are manufactured such that the actuator may be operated within the optimum range with reference to the state where the reference projection of the first insertion adjustment portion 317 is positioned on the second reference face 327b.

The back focal length (317) may have a value that is different from a pre-set value due to the manufacturing tolerance of, for example, the lens module 310 and the carrier 320. At this time, when the focus is positioned on the rear face of the image sensor 341, the lens module 310 and the carrier 320 are assembled such that the reference projection of the first insertion adjustment portion 317 is positioned on the third reference face 327c. That is, it is possible to obtain an effect of moving the focal distance toward the front face of the image sensor 341. On the contrary, when the focus is positioned on the front face of the image sensor 341, the lens module 310 and the carrier 320 are assembled such that the reference projection of the first insertion adjustment portion 317 is positioned on the first reference face 327a. At this time, it is possible to obtain an effect of moving the focal length toward the rear face of the image sensor 341. That is, in either case, the actuator is enabled to operate within a pre-designed section.

As described above, according to a camera module of various embodiments of the present disclosure, a lens module may be moved by an actuator of the camera module to perform auto-focus, and the actuator may mechanically correct the distance in which the lens module is moved. That is, since the focal length of the camera module may be adjusted to be positioned within a pre-set section, the accurate operation start point of the actuator and the start point of the focal length may be adjusted.

While this disclosure has been particularly shown and described with reference to embodiments thereof, it will be understood by those skilled in the art that various changes in form and details may be made therein without departing from the spirit and scope of this disclosure as defined by the appended claims.

What is claimed is:

1. An auto-focus camera module comprising:
   a lens module including at least one lens, a cylindrical insertion unit formed in the lens module, and a first rotation prevention portion; and
   a carrier formed to include a hollow portion, into which the insertion unit of the lens module is configured to be inserted in an optical axis direction of the lens,
   wherein the lens module includes a first insertion adjustment portion,
   wherein the carrier includes a second rotation prevention portion formed at a position corresponding to the first rotation prevention portion and a second insertion adjustment portion formed to correspond to the first insertion adjustment portion,
   wherein the first insertion adjustment portion is a reference projection having a projection shape protruding from an outer circumference of the lens module, or the second insertion adjustment portion is a reference projection protruding from one end of the carrier, and
   when the insertion unit of the lens module is inserted into the hollow portion of the carrier, the first rotation prevention portion and the second rotation prevention portion are engaged with each other so as to prevent the lens module from being rotated with respect to the carrier, and when the first insertion adjustment portion and the second insertion adjustment portion are in contact with each other, insertion of the insertion unit into the hollow portion is restricted, and
   wherein the second insertion adjustment portion is a step portion formed with a plurality of reference faces to be in contact with the reference projection of the first insertion adjustment portion.

2. The camera module of claim 1, wherein the first rotation prevention portion and the second rotation prevention portion are formed to be engaged with each other as a rotation angle of the lens module is changed with respect to the carrier.

3. The camera module of claim 2, wherein
   a depth of the insertion unit of the lens module inserted into the hollow portion of the carrier is adjusted step by step by the second insertion adjustment portion and the first insertion adjustment portion.

4. The camera module of claim 1, wherein the first insertion adjustment portion includes a step portion on which are formed a plurality of reference faces to be in contact with the reference projection of the second insertion adjustment portion.

5. The camera module of claim 4, the reference faces are formed by a plurality of steps with stair shapes.

6. The camera module of claim 4, wherein, when the lens module and the carrier are coupled to each other, the reference projection comes in contact with any one of the plurality of reference faces, and
   as the plurality of reference faces that are in contact with the reference projection are changed, a depth of the insertion unit of the lens module inserted into the hollow portion of the carrier is changed.

7. The camera module of claim 6, wherein the reference projection is positioned such that a 120° interval is maintained between neighboring reference projections.

8. The camera module of claim 7, wherein the first rotation prevention portion includes an engaging projection protruding from the outer circumference of the lens module, the second rotation prevention portion includes a plurality of engaging grooves to be engaged with the engaging projection, and
   the plurality of engaging grooves are formed along a circumference of the hollow portion.

9. The camera module of claim 8, wherein the engaging projection is engaged in any one of the plurality of engaging grooves to restrict free rotation of the lens module with respect to the carrier.

10. The camera module of claim 9, wherein the plurality of engaging grooves are three engaging grooves.

11. The camera module of claim 10, further including:
    an actuator moving the carrier in an optical axis direction.

12. The camera module of claim 11, further including:
    an image sensor facing the lens module,
    wherein as one of the plurality of reference faces, where the reference projection is in contact, is changed, a spacing between the lens module and the image sensor is adjusted.

13. An electronic device comprising:
    an auto-focus camera module, the auto-focus camera module comprising:
    a lens module including at least one lens, a cylindrical insertion unit formed in the lens module, and a first rotation prevention portion; and
    a carrier formed with a hollow portion, into which the insertion unit of the lens module is inserted in an optical axis direction of the lens,
    wherein the lens module includes a first insertion adjustment portion,
    wherein the carrier includes a second rotation prevention portion formed at a position corresponding to the first rotation prevention portion and a second insertion adjustment portion formed to correspond to the first insertion adjustment portion,
    wherein the first insertion adjustment portion is a reference projection having a projection shape protruding from an outer circumference of the lens module, or the second insertion adjustment portion is a reference projection protruding from one end of the carrier, and
    when the insertion unit of the lens module is inserted into the hollow portion of the carrier, the first rotation prevention portion and the second rotation prevention portion are engaged with each other so as to prevent the lens module from being rotated with respect to the carrier, and when the first insertion adjustment portion and the second insertion adjustment portion are in contact with each other, insertion of the insertion unit into the hollow portion is restricted, and
    wherein the second insertion adjustment portion is a step portion formed with a plurality of reference faces to be in contact with the reference projection of the first insertion adjustment portion.

14. The electronic device of claim 13, wherein the first rotation prevention portion and the second rotation prevention portion are formed to be engaged with each other as a rotation angle of the lens module is changed with respect to the carrier.

15. The electronic device of claim 14, wherein
    a depth of the insertion unit of the lens module inserted into the hollow portion of the carrier is adjusted step by step by the second insertion adjustment portion and the first insertion adjustment portion.

16. The electronic device of claim 13, wherein the second insertion adjustment portion is a reference projection protruding from one end of the carrier, and the first insertion adjustment portion includes a step portion on which are formed a plurality of reference faces to be in contact with the reference projection of the second insertion adjustment portion.

\* \* \* \* \*